United States Patent [19]

Jones

[11] 4,271,736
[45] Jun. 9, 1981

[54] SAWMILL APPARATUS WITH VERTICALLY MOVABLE LOGGING DOGS

[76] Inventor: Aaron U. Jones, 1880 McLean Blvd., Eugene, Oreg. 97405

[21] Appl. No.: 123,170

[22] Filed: Feb. 21, 1980

[51] Int. Cl.³ .................. B27B 15/04; B27B 29/08
[52] U.S. Cl. ................................ 83/156; 83/412; 83/425.2; 83/435.1; 144/312
[58] Field of Search ............... 83/435.1, 433, 425.2, 83/412, 708–712, 155, 156; 144/312

[56] References Cited

U.S. PATENT DOCUMENTS

| | | | |
|---|---|---|---|
| 2,741,278 | 4/1956 | McMurtrie | 83/708 |
| 3,786,712 | 1/1974 | Mackin | 83/435.1 X |

*Primary Examiner*—Frank T. Yost

*Attorney, Agent, or Firm*—Klarquist, Sparkman, Campbell, Leigh, Whinston & Dellett

[57] ABSTRACT

A sawmill apparatus includes first and second carriages for supporting first and second logging dogs therebeneath, with the second carriage being movable upon the first whereby to engage the ends of a log between the dogs. The carriages support the dogs at the end of steel blades which are moved in a vertical direction by a combination of air cylinders and ball screws to provide accurate positioning of the log at a predetermined distance above a lower saw guide and at a predetermined distance above an outfeed conveyor. Side braces are mounted on each carriage and extend downwardly on each side of the blades carrying the log engaging dogs, the side braces supporting bearing members disposed in slidable relation to the blades for maintaining alignment thereof in the direction of carriage movement.

4 Claims, 4 Drawing Figures

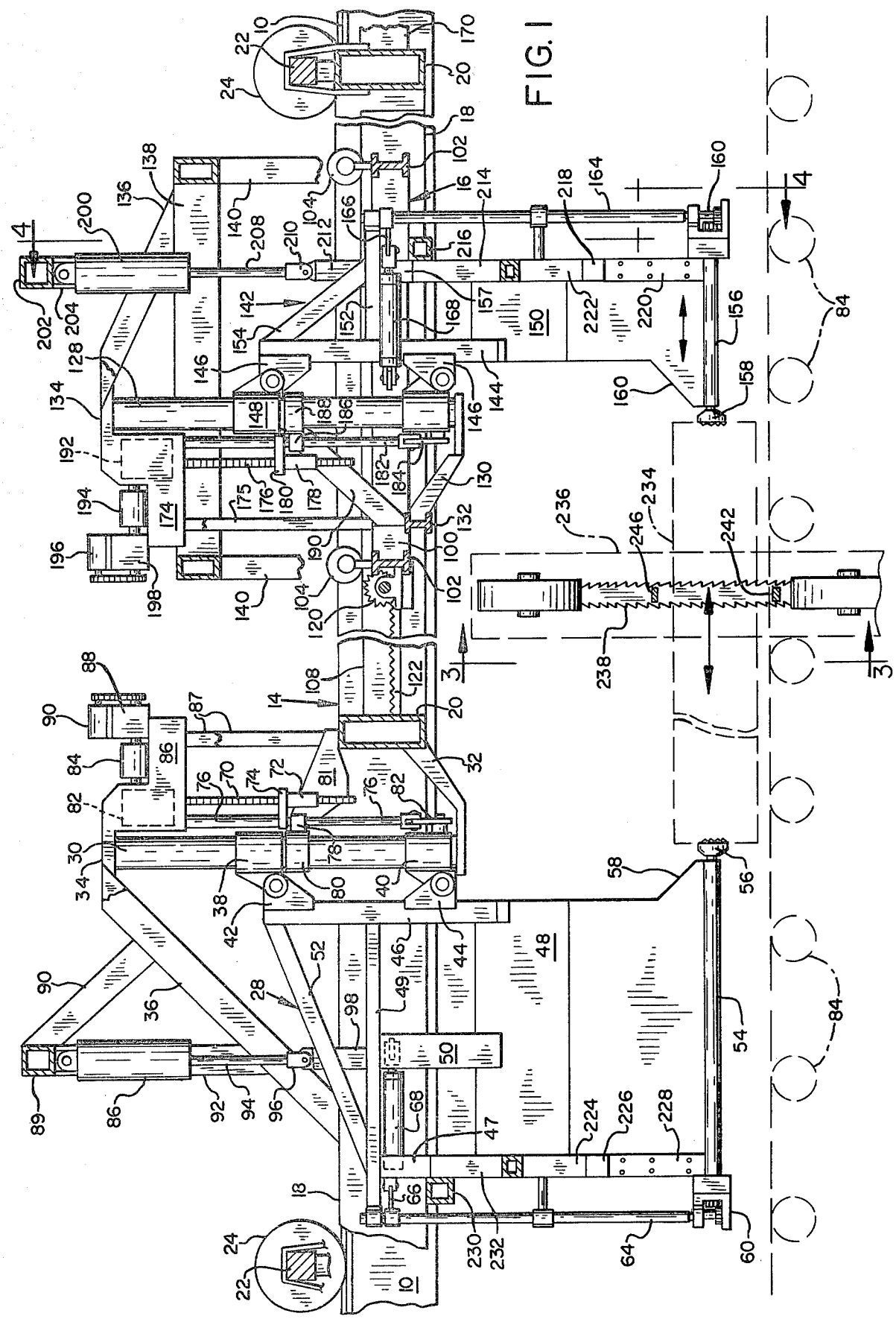

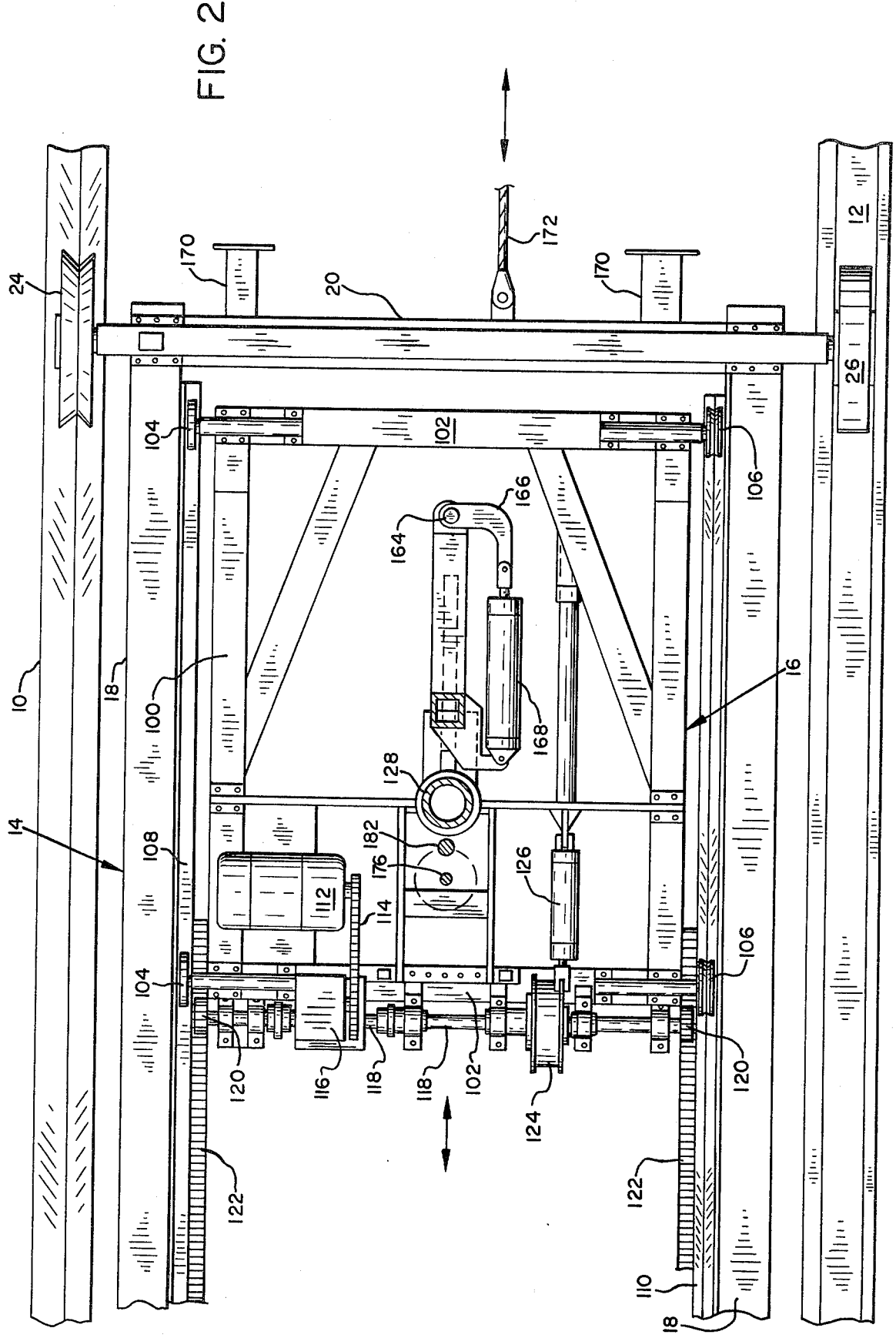

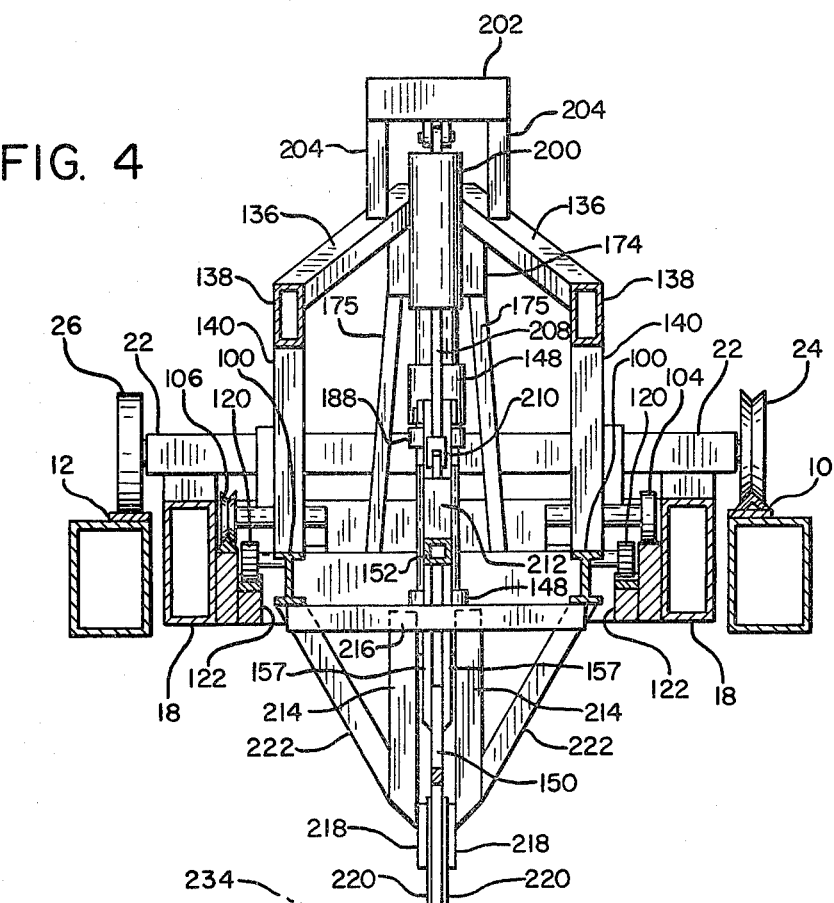
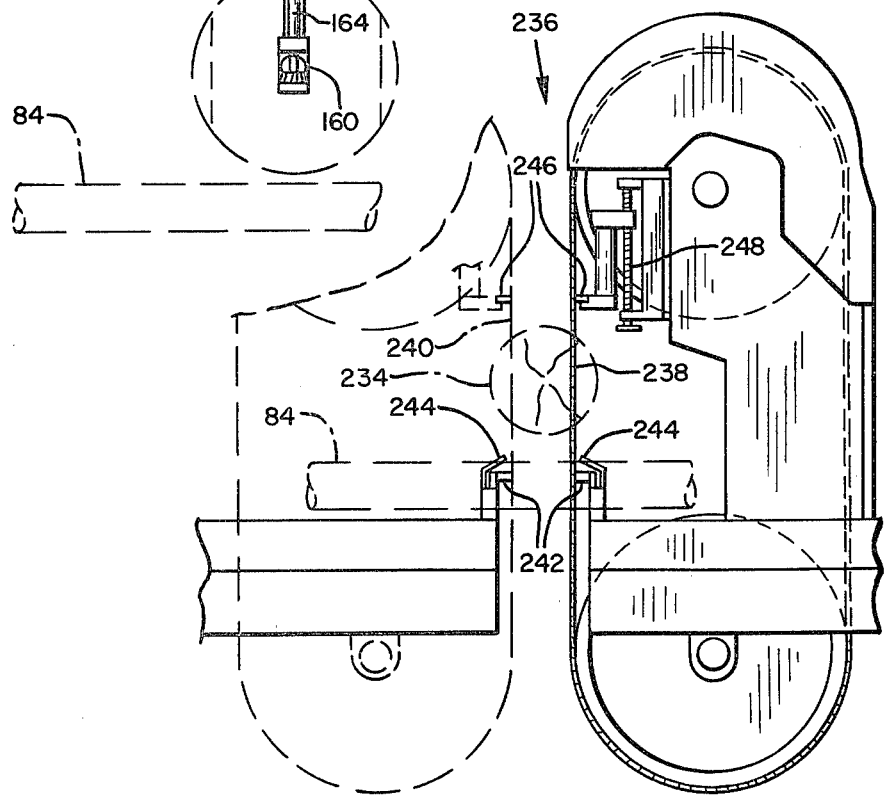

SAWMILL APPARATUS WITH VERTICALLY MOVABLE LOGGING DOGS

BACKGROUND OF THE INVENTION

The present invention relates to sawmill apparatus provided with vertically moving log engaging dogs, and particularly to such apparatus for accurately moving the log engaging dogs without binding and without misalignment.

In known sawmills, a log is engaged endwise between a pair of dog members and propelled through a saw for severing the log into a plurality of boards and cants. Sawing may be accomplished as the log moves in both forward and reverse directions through a saw, with the saw blade being repositioned between first and second passes. The log is conventionally delivered between the log engaging dogs by conveyor means having some vertical adjustment so the dogs can engage a log approximately midway of each end despite the varying diameter sizes of logs that may be encountered. The dogging members themselves are usually not vertically movable, but may be positioned at such height that the largest log encountered will have its lower perimeter placed well above the lower saw guide for avoiding any damage to the saw apparatus. Unfortunately, this can produce considerable drop in the cants or boards sawn from the log as they fall onto an outfeed conveyor therebelow, resulting in damage to the lumber as well as possible damage to the equipment.

While mills have been previously constructed with vertically movable dogs, e.g. employing a vertical ball screw for producing the vertical adjustment, operation thereof has not been entirely satisfactory because of the considerable weight required of a dogging apparatus if it is to successfully engage and hold a log. Thus, prior apparatus has been unable to raise and lower the dogs without binding and operating inaccuracies or actual stalling of the equipment. Moreover, when dogging apparatus is made vertically adjustable, difficulties are encountered due to side movement of the dogging apparatus because of the narrow profile necessary for passing through the sawing apparatus, resulting in inaccurate sawing.

SUMMARY OF THE INVENTION

A sawmill apparatus includes a bandsaw and first and second carriages each supporting a log engaging member. The carriages are movable relative to one another for engaging the ends of a log and are jointly movable for driving the log through the bandsaw whereby a plurality of boards or cants are dropped onto an awaiting outfeed conveyor. Each of the log engaging members is vertically adjustable for accurately positioning the log engaging member in desired relation to the center of the log while maintaining the position of the bottom periphery of the log at a predetermined small distance above the lower saw guide of the bandsaw and above the outfeed conveyor means. In accordance with the present invention, the vertically movable log engaging members are provided with side braces mounted on the same carriage and extending downwardly to position bearing members in slidable relation to the sides of the log engaging members. As a consequence, side movement of a log engaging means, as might accompany vertical movement, is avoided.

It is accordingly an object of the present invention to provide an improved sawmill apparatus capable of more accurately sawing logs of varying sizes.

It is another object of the present invention to provide an improved sawmill apparatus for sawing logs into cants or boards which are less damaged as the result of sawmill operation.

It is another object of the present invention to provide an improved sawmill apparatus having vertically movable dogs which are accurately aligned in the desired direction of travel.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a side view, partially broken away and partially in cross section, of a sawmill apparatus according to the present invention;

FIG. 2 is a top view of a portion of the FIG. 1 apparatus, also partially broken away and partially in cross section;

FIG. 3 is a front elevational view, partially broken away, illustrating bandsaw apparatus employed according to the present invention; and FIG. 4 is a cross-sectional view as taken at 4—4 in FIG. 1.

DETAILED DESCRIPTION

Referring to the drawings illustrating a preferred embodiment according to the present invention, and particularly to FIG. 1, a pair of parallel steel rails 10 and 12 bear a system of carriages comprising a larger or outer carriage 14 supporting an inner carriage 16, each of said carriages carrying a log engaging member. The first or outer carriage comprises rectangular side beams 18 joined by rectangular cross beams 20 at spaced points therealong. At the end extremities of the first carriage, cross beams 20 are attached to cross supports 22 having means for journaling stub shafts of wheels 24 and 26 which ride upon rails 10 and 12. The top of rail 12 as well as the rim of wheel 26 are flat, while the top of rail 10 and the rim of wheel 24 are V-shaped in cross section whereby the first carriage is laterally positioned.

Supported from the first carriage is a frame 28 for carrying a first log engaging member. In particular, a first vertical column 30 is disposed between a lower support member 32, secured to a cross beam 20, and a top support 34. Diagonal braces 36 extend downwardly from the top support and are secured to the beams 18 and 20. Upper and lower cylindrical bearing members 38 and 40 are slidably received on column 30 and are pivotally connected to brackets 42 and 44 welded to frame 28, the pivotal connections acting to prevent binding as the bearing members slide up and down on the columns. The frame 28 consists of first hangers 46 extending downwardly where they are welded to either side of blade 48 of a first log engaging member, and a longitudinal frame arm 49, secured in perpendicular relation at the center of hangers 46, carrying second hangers 47 and third or central hangers 50 extending downwardly and welded to sides of blade 48. Diagonal brace 52 is disposed between the top of hangers 46 and the outer end of arm 48. It is noted the blade 48 is positioned in alignment with the direction of movement of the carriage 14, i.e. in a direction parallel to rails 10 and 12.

Blade 48 is provided at its lower extremity with a horizontal tube 54 receiving therewithin the shaft of a rotatable dog 56 located at the forward end of blade 48, the blade 48 and tube 54 being canted forwardly at 58 to place dog 56 substantially directly under the center of column 30. The rearward end of the dog shaft is driven through gearing 60 by vertical shaft 64, the upper end of which is provided with an arm 66 operated via the actuating rod of hydraulic cylinder 68 for rotating the dog 56. Dog 56 can be rotated through ninety degrees for similarly rotating a log engaged whereby a second saw cut can be made in perpendicular relation to a first saw cut.

The first log engaging member including blade 48 and dog 56 is vertically adjustable for vertically positioning a log, and this vertical adjustment is brought about by means of a vertical ball screw 70 threadably engaging ball bearings in cooperating member 72, the latter having a bracket 74 positioned under a shoulder on a guide rod 76 disposed in parallel relation to the ball screw. Guide rod 76 passes through extension 78 of collar 80 secured approximately midway on column 30, and the guide rod is attached by means of flexible connection 82 to lower bearing member 40. Support member 81 joins collar 80 to a cross beam 20 providing further support to column 30.

Ball screw 70 is rotated by means of right angle reduction gearing 82 operated by motor 85 positioned in a housing 86 depending from top support 34 and braced by supports 87 extending to the carriage. Motor 85 also turns reduction gearing 88 for rotating encoder 90 adapted to indicate and control the extent of rotation of the ball screw, said encoder and reduction gearing also being supported by housing 86. As will be noted, rotation of the ball screw operates to raise and lower bearing member 40 via guard rod 76, and therefor predetermined rotation of the ball screw is adapted to position the log engaging member at a desired vertical height above rollers 84 of underlying conveyor means.

Also functioning to raise and lower the log engaging member is an air cylinder 86 pivotally supported from underneath a cross arm 89 attached to the first carriage by means of vertical members 92 extending downwardly to diagonal braces 36, and by means of diagonal arms 90 also secured to diagonal braces 36. Actuating rod 94 concludes in a clevis 96 for attaching the actuating rod to an arm 98 extending upwardly from the approximate center of frame 28. For lifting the quite heavy blade 48, typically formed of steel plate, a regulated high air pressure is applied to air cylinder 86 via a conventional air regulator (not shown) whereby actuating rod 94 moves blade 48 upwardly and prevents binding and undue stress on ball screw 70. When ball screw 70 has turned by a desired amount and the log engaging member has raised to the extent desired as gauged by encoder 90, the ball screw motor 85 is no longer energized and a lower pressure is applied to air cylinder 86. For lowering the log engaging member, a lower pressure is maintained in air cylinder 86 whereby the log engaging member is lowered under the control of the ball screw. The ball screw and air cylinder thus cooperate in raising and lowering the log engaging member accurately without undue stress.

The second or inner carriage 16 comprises longitudinal I-beams 100 joined by cross beams 102 at either end thereof. Carriage wheels 104 and 106 are rotatable on stub shafts secured upwardly from the four corners of the second carriage and these wheels travel along rails 108 and 110 respectively secured within side beams 18 of the first carriage. Wheels 104 and rail 108 are flat in cross section, while wheels 106 and rail 110 are V-shaped for accurately positioning the second carriage in a lateral direction.

Referring particularly to FIG. 2, the second carriage, identified by reference numeral 16, supports drive motor 112 having a driving chain connection 114 to gear reducer 116 for rotating shaft 118 which is located at the forward edge of the carriage and provided with pinions 120 at opposite ends thereof. The pinions 120 engage racks 122 attached adjacent the inside of rails 108 and 110. It will be seen that operation of motor 112 will drive pinions 120 and cause the carriage 16 to move along tracks 108 and 110 on the main carriage 14. The log engaging member supported by carriage 16 will thus be moved relative to the log engaging member supported by carriage 14, e.g. for the purpose of engaging a log. Brake 124 suitably provided with hydraulic cylinder 126 is employed for locking the carriage 16 in place as when a log is securely retained between the log engaging members. Bumpers 170 are provided at the end of the main carriage for encountering an abutment (not shown) at the end of carriage travel, and a steel cable 172 is employed for moving the carriage via a reel and motor (not shown) for pulling the carriage in a direction for sawing a log.

Referring to FIG. 1, the second carriage includes a column 128 positioned between a lower support member 130 attached to a cross I-beam 132, located underneath the second carriage, and a top support 134. Diagonal arms 136 extend downwardly from the top support toward upper horizontal members 138 forming part of an upper framework joined to the lower part of the second carriage by means of vertical end members 140.

A supporting frame 142 for a second log engaging member comprises vertical hangers 144 secured to brackets 146 providing pivotal connections to bearing members 148 slidably received on column 128. Hangers 144 are welded in supporting relation to each side of blade 150 comprising part of the second log engaging member. The frame 142 further includes a horizontal member 152 extending perpendicularly from approximately the center of hangers 144 in a direction longitudinal of the carriage, while a diagonal brace 154 is interposed between the upper ends of hangers 144 and a point approximately two-thirds the way along member 152 from the hangers 144. Second vertical hangers 157 are disposed downwardly at approximately this point and are welded to the blade 150. It is noted blade 150 is disposed in aligned relation with the direction of movement of carriage 16.

Blade 150, which is somewhat shorter than blade 148 but nevertheless extremely heavy, is provided with a horizontal tube 156 at its lower extremity for receiving the shaft of a log engaging dog 158. The blade 150 and tube 156 are canted forwardly as indicated at 160 to position the dog 158 approximately centrally under column 128. The opposite end of the shaft for dog 158 cooperates with gearing 160 driven in ninety degree relation by shaft 164 having an arm 166 at its upper end actuated by hydraulic cylinder 168. Cylinder 168 is operated for orienting the dog 158 in two different, approximately perpendicular positions. The log can be thereby oriented in one position for one pass through a saw, and then turned by ninety degrees for sawing in a perpendicular direction.

For vertically adjusting the position of the log engaging means including blade 150 and dog 158, the second carriage is provided with a ball screw 176 having a threaded connection with ball bearings in cooperating member 178 having a bracket 180 positioned under a shoulder of guide rod 182 disposed in parallel relation to ball screw 176. The lower end of guide rod 182 is attached by means of flexible connection 184 to the lower bearing member 148, the guide rod passing through an extension 186 of collar 188 joined approximately centrally to column 128 and supported by means of diagonal brace 190 disposed between the collar and the top of cross beam 132 of the second carriage. Ball screw 176 is rotated by means of right angle reduction gearing 192 driven by motor 194, the said motor also driving encoder 196 through reduction gearing 198 to provide an indication of the extent of rotation of the ball screw for controlling the same. The reduction gearing, motor and encoder are supported by housing 174 extending downwardly from top support 134 and braced by members 175 extending to carriage 16.

In conjunction with the ball screw, the second log engaging member is moved in a vertical direction by means of an air cylinder 200 connected to cross arm 202 supported above the second carriage by vertical members 204 extending to diagonal arms 136. The actuating rod 208 of air cylinder 200 concludes in a clevis 210 pivotally joined to an upright 212 extending upwardly from supporting frame 142 in approximate alignment with the rear end of blade 150. For raising the frame 142, and the log engaging member supported thereby, a regulated high pressure is applied to air cylinder 200 while ball screw 176 is rotated in the desired direction by motor 194 such that substantial stress is taken off the ball screw. When the desired vertical position is reached in upraising the log engaging member, rotation of the ball screw is concluded and the air pressure to cylinder 200 is reduced. In lowering the log engaging member, a predetermined lower pressure is applied to air cylinder 200 and the ball screw is rotated in the opposite direction. The log engaging members can thus be raised and lowered relative to the conveyor comprising rollers 84.

Each of the blades 48 and 150 is provided with side braces mounted on respective carriages and extending downwardly on each side of the blade for maintaining correct horizontal positioning by preventing side sway of the respective blades in the lateral direction of the apparatus. First considering blade 150 and referring to FIGS. 1 and 4, a pair of vertical supports 214 extend downwardly from lateral beam 216 carried underneath side beams 100 of carriage 16. Bearing pads 218 are secured to lower facing sides of vertical supports 214 and ride upon bearing plates 220 attached along the rearward side edges of blade 150, while angular side braces 222 extending downwardly from side beams 100 and lateral beam 216 hold the pads 218 against bearing plate 220 to maintain proper blade alignment while permitting slidable movement between the pads and the bearing plate. It will be seen that the blade 150 and the dog 158 carried thereby will be constrained to an aligned path along the direction of movement of carriage 16 without substantial turning or side play. The bearing pads have metal bearing surfaces.

Also, angular side braces 224 hold pads 226 against bearing plates 228 secured to rearward lateral sides of blade 48 of the first log engaging member. The angular braces 224 are attached to lateral beam 230 forming part of the first carriage, while vertical supports 232 also extend downwardly from the lateral beam in securing relation to pads 226. Thus, blade 48 and dog 56 carried thereby are maintained in proper alignment with the direction of movement of the first carriage. Pads 226 are also metal.

In operation, the sawmill apparatus according to the present invention is adapted to engage ends of a log 234 for carrying the log through a bandsaw apparatus indicated at 236 in FIG. 1 and further illustrated in FIG. 3. The bandsaw apparatus comprises a pair of bandsaws driving blades 238 and 240 respectively, each having saw teeth on both their forward and rearward edges. As will be observed in FIG. 3, the bandsaw blades 238 and 240 may be positioned in relatively close spaced relation, and the blades 48 and 150 carrying the respective dogs 56 and 158 are adapted to pass between the bandsaw blades while the log is cut into boards or cants as desired. The bandsaws are adapted to move toward and away from one another (by means not shown) whereby varying cuts may be made depending upon the size of the log and the direction the same is passing through the bandsaws. Typically, the log is carried through the bandsaws in a first direction, while the bands are more widely spaced, after which the bands are positioned closer to one another and the direction of log movement reversed for taking a second cut. Alternatively, the log may be rotated by simultaneously turning shafts 64 and 164 after a first cut for making a second cut in ninety degree relation to the first.

Prior to sawing, the log is first delivered to the apparatus (by means not shown) between dogs 46 and 158 while both dogs are positioned on the same side of the bandsaw. Relative movement between the dogs is provided through movement of carriage 16 in the direction away from the remote end of carriage 14, i.e. so dog 158 will move toward dog 56. After the log is engaged endwise between the dogs, carriage 16 is braked in place and carriage 14 is moved by means of cable 172, or a similar cable at the opposite end of carriage 14, for urging the log through the bandsaw. After the first pass, the carriage 14 may be moved in the reverse direction through the bandsaw for producing a second cut.

The apparatus as herein described has the advantage of providing vertical log movement whereby the log may be easily dogged near the center axis thereof, and whereby the cants or boards cut from the log do not have to drop a great distance onto the conveyor comprising rollers 84 after being severed from the log, resulting in decreased damage to the cut lumber. The dogs are moved simultaneously in a vertical direction through joint operation of both said air cylinders and both said ball screws so the dogs will engage the log ends near the center, and after the log is engaged, the dogs are positioned through joint operation of both air cylinders and both ball screws so the log will be at a predetermined level, unless it is already at such level. In particular, the perimeter of log 234 in its final dogged position is disposed a predetermined distance above lower saw guides 242 and the guards 244 therefor (see FIG. 3), regardless of the size of the log, and will therefore provide cants and boards at a minimum distance above the conveyor comprising rollers 84. A typical distance between the lower perimeter of the log and the top of guards 244 is five and one-half inches. The top saw guide, for example as illustrated at 246 in FIG. 3, is vertically adjustable in accordance with the size of the log via motorized adjusting screw 248 such that the upper and lower saw guides are positioned as closely as possible to the log for maintaining an accurate path of blade 238 across the log.

Increased accuracy in sawing is thereby achievable in addition to decreasing the drop and consequent damage as may result from cut pieces falling by any appreciable distance onto the conveyor therebelow. It is seen these advantages would not be obtainable with a conventional apparatus wherein the dogs have a fixed vertical position and input conveyor means vertically position the log so as to be dogged approximately centrally with the resulting variable distance between the log and lower saw guide and between the cut pieces and the underlying conveyor. At the same time, the bearing pads 218, 226 according to the present invention keep the dogs in proper alignment even though the blades carrying the same are vertically movable.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:
1. In a sawmill apparatus,
a bandsaw,
a first movable carriage supporting a first log engaging member,
a second movable carriage supporting a second log engaging member, said second carriage being movable relative to said first carriage for engaging the log, and being movable with said first carriage for driving said log toward said bandsaw,
conveyor means disposed below the path of said log engaging members and adjacent said bandsaw for receiving boards and cants cut from said log by said bandsaw,
means for adjusting the vertical position of said log above said cnveyor means by vertically moving said log engaging members,
and side braces mounted on each said carriage and extending downwardly on each side of said log engaging members, each brace carrying a bearing member disposed in slidable relation to a side of a said log engaging member for maintaining alignment during movement thereof.

2. The apparatus according to claim 1 wherein each of said log engaging members comprises a blade in depending relation to a said carriage and in aligned relation with the direction of movement of the carriage, the bearing members carried by each brace being disposed in slidable relation to a side of a said blade.

3. The apparatus according to claim 2 wherein said braces include angular members extending laterally downwardly from spaced lateral points on said carriages for supporting said bearing members.

4. The apparatus according to claim 3 further including vertical supports extending downwardly from said carriages in supporting relation to said bearing members.

* * * * *